(12) United States Patent
Rubio et al.

(10) Patent No.: US 9,141,853 B1
(45) Date of Patent: Sep. 22, 2015

(54) SYSTEM AND METHOD FOR EXTRACTING INFORMATION FROM DOCUMENTS

(71) Applicant: First American Financial Corporation, Santa Ana, CA (US)

(72) Inventors: Christopher Lawrence Rubio, Oceanside, CA (US); Vladimir Sevastyanov, Irvine, CA (US)

(73) Assignee: First American Financial Corporation, Santa Ana, CA (US)

( * ) Notice: Subject to any disclaimer, the term of this patent is extended or adjusted under 35 U.S.C. 154(b) by 0 days.

(21) Appl. No.: 14/079,422

(22) Filed: Nov. 13, 2013

Related U.S. Application Data

(63) Continuation of application No. 13/104,796, filed on May 10, 2011, now Pat. No. 8,620,079.

(51) Int. Cl.
*G06K 9/34* (2006.01)
*G06K 9/00* (2006.01)
*G06K 9/36* (2006.01)

(52) U.S. Cl.
CPC .................................. *G06K 9/00442* (2013.01)

(58) Field of Classification Search
None
See application file for complete search history.

(56) References Cited

U.S. PATENT DOCUMENTS

| | | | | |
|---|---|---|---|---|
| 7,398,481 B2 * | 7/2008 | Kraus et al. | ................... | 715/848 |
| 7,916,972 B2 * | 3/2011 | Meunier | ....................... | 382/291 |
| 8,620,079 B1 * | 12/2013 | Rubio et al. | .................. | 382/175 |

OTHER PUBLICATIONS

Peng, Hanchuan, et al. "Document image template matching based on component block list." Pattern Recognition Letters 22.9 (2001): 1033-1042.*

* cited by examiner

*Primary Examiner* — Thomas Conway
(74) *Attorney, Agent, or Firm* — Sheppard Mullin Richter & Hampton LLP

(57) ABSTRACT

Various embodiments of the invention provide systems and methods for extracting information from digital documents, including physical documents that have been converted to digital documents. For example, some embodiments are configured to extract information from a field in a digital document by identifying a block of tokens before (i.e., a prior block) and a block of tokens after (i.e., a post block) the field from which the information is to be extracted, where both the prior block and post block are known to be associated with the field type of the field (e.g., name, address, phone number, etc.).

20 Claims, 17 Drawing Sheets acknowledge and deliver a guaranty of the amounts lent by Lender under said promissory note Borrower: ____Smithville Properties, LLC____ ← 703

Name & Title of Principal Borrower: ____John Doe, member____

| Occurrences | m_discrimination | m_used | m_occurence | m_occurenceType | m_words |
|---|---|---|---|---|---|
| under said promissory note. Borrower: | 0 | 0 | 0 | prior | See, 900 |
| Name & Title of Princi | 0 | 0 | 0 | post | See, 1000 |

| Tokens | m_discrimination_token | m_used_token | m_occurence_token |
|---|---|---|---|
| under | 0 | 1 | 1 |
| said | 0 | 1 | 1 |
| promissory | 0 | 1 | 2 |
| note. | 0 | 1 | 1 |
| Borrower: | 0 | 1 | 1 |

| Tokens | m_discrimination_token | m_used_token | m_occurence_token |
|---|---|---|---|
| Name | 0 | 1 | 1 |
| & | 0 | 1 | 1 |
| Title | 0 | 1 | 2 |
| of | 0 | 1 | 20 |
| Princi | 0 | 1 | 1 |

| Tokens | m_discrimination_token | m_used_token | m_occurence_token |
|---|---|---|---|
| under | 0 | 2 | 2 |
| said | 0 | 2 | 2 |
| promissory | 0 | 2 | 5 |
| note. | 0 | 2 | 3 |
| Borrower: | 0 | 1 | 1 |

*FIG. 11*

| Tokens | m_discrimination_token | m_used_token | m_occurence_token |
|---|---|---|---|
| under | 1 | 1 | 1 |
| said | 1 | 1 | 1 |
| promissory | 0.5 | 1 | 2 |
| note. | 1 | 1 | 1 |
| Borrower: | 1 | 1 | 1 |

| Tokens | m_discrimination_token | m_used_token | m_occurence_token |
|---|---|---|---|
| Name | 1 | 1 | 1 |
| & | 1 | 1 | 1 |
| Title | 1 | 1 | 1 |
| of | 0.05 | 1 | 20 |
| Princi | 1 | 1 | 1 |

| Occurrences | m_discrimination | m_used | m_occurence | m_occurenceType | m_words |
|---|---|---|---|---|---|
| under said promissory note. Borrower: | 4.5 | 5 | 6 | prior | See, 900 |
| Name & Title of Princi | 4.05 | 5 | 24 | post | See, 1000 |

| Tokens | Occurrences |
|---|---|
| & | Name & Title of Princi |
| | Name & Title of: |
| ("Borrower") | ("Borrower") acknowledges receipt of the |
| : | Name & Title of: |
| Borrower: | under said promissory note. Borrower: |
| Mail | Mail To: [[TEXT]] The undersigned borrower |
| Name | Name & Title of Princi |
| | Name & Title of: |
| Princi | Name & Title of Princi |
| The | Mail To: [[TEXT]] The undersigned borrower |
| | return to: [[TEXT]] The undersigned borrower |
| Title | Name & Title of Princi |
| | Name & Title of: |
| To: | Mail To: [[TEXT]] The undersigned borrower |
| [[TEXT]] | Mail To: [[TEXT]] The undersigned borrower |
| | return to: [[TEXT]] The undersigned borrwer |
| acknowledges | ("Borrower") acknowledges receipt of the |
| borrower | Mail To: [[TEXT]] The undersigned borrower |
| | return to: [[TEXT]] The undersigned borrower |
| note. | under said promissory note. Borrower: |
| of | Name & Title of Princi |
| | Name & Title of: |
| | ("Borrower") acknowledges receipt of the |
| promissory | under said promissory note. Borrower: |
| receipt | ("Borrower") acknowledges receipt of the |
| return | return to: [[TEXT]] The undersigned borrower |
| said | under said promissory note. Borrower: |
| the | ("Borrower") acknowledges receipt of the |
| to: | return to: [[TEXT]] The undersigned borrower |
| under | under said promissory note. Borrower: |
| undersigned | Mail To: [[TEXT]] The undersigned borrower |
| | return to: [[TEXT]] The undersigned borrower |

*FIG. 15*

RECEIPT AND MORTGAGE

Date : October 29, 2009

The undersigned General Holdings, LLC ("Borrower") acknowledges receipt of the proceeds of the loan from Titan Funding Group, LLC ("Lender") in the sum of $112,590.00, as evidenced by check payable to Executive ("Trustee"). The loan was made to Borrower to purchase the Real Property legally described as:

Lot 32,Stonegate Crossing Unit 3, according to Book 263 of Maps, Page 44, and Affidavit of Correction recorded in Document No. 89-418175, records of Maricopa Country, Arizona.

940 E Gila Chandler, AZ 85225

At a trustee's sale conducted by Trustee, which took place on October 28, 2009, at which Borrower became successful purchaser for the highest bid.

Borrower hereby grants Lender or assignee a first, prior and superior equitable lien and mortgage against the Real Property to secure payment of the loan. The undersigned principal of Borrower (expecting to derive benefits from the extension of credit to Borrower and to induce Lender to extend financial accommodations to Borrower) hereby irrevocably and unconditionally guarantees and promises to pay to Lender upon demand the loan amount and for all sums payable or to become payable hereunder if Borrower fails to pay punctually and one or more amounts when due. Borrower further agrees to execute, acknowledge and deliver to Lender a promissory note and deed of trust in Lender's usual and customary form, the deed of trust to be recorded against the Real Property as a first, prior and superior lien and encumbrance, simultaneously with the recording of the Trustee's Deed. Borrower further agrees to cause the undersigned principal of Borrower to execute, acknowledge and deliver a guaranty of the amounts lend by Lender under said promissory note.

Borrower: Roger Riley d/b/a General Holdings, LLC
Name & Title of Principal Borrower:

*FIG. 16*

| m_priors | under said promissory note. Borrower: | | | |
|---|---|---|---|---|
| | m_discrimination | 4.07 | | |
| | m_used | 9 | | |
| | m_occurence | 13 | | |
| | m_words | Tokens | m_discrimination_token | m_used_token | m_occurence_token |
| | | under | 1 | 2 | 2 |
| | | said | 1 | 2 | 2 |
| | | promissory | 0.4 | 2 | 5 |
| | | note. | 0.67 | 2 | 3 |
| | | Borrower: | 1 | 1 | 1 |
| 800 | Mail To: [[TEXT]] The undersigned borrower | | | |
| | m_discrimination | 4.53 | | |
| | m_used | 6 | | |
| | m_occurence | 12 | | |
| | m_words | Tokens | m_discrimination_token | m_used_token | m_occurence_token |
| | | Mail | 1 | 1 | 1 |
| | | To: | 1 | 1 | 1 |
| | | [[TEXT]] | 1 | 1 | 5 |
| | | The | 0.2 | 1 | 3 |
| | | undersigned | 0.33 | 1 | 3 |
| | | borrower | 1 | 1 | 1 |
| | return to: [[TEXT]] The undersigned borrower | | | |
| | m_discrimination | 4.03 | | |
| | m_used | 6 | | |
| | m_occurence | 13 | | |
| | m_words | Tokens | m_discrimination_token | m_used_token | m_occurence_token |
| | | return | 1 | 1 | 1 |
| | | to: | 0.5 | 1 | 2 |
| | | [[TEXT]] | 1 | 1 | 1 |
| | | The | 0.2 | 1 | 5 |
| | | undersigned | 0.33 | 1 | 3 |
| | | borrower | 1 | 1 | 1 |

*FIG. 17A*

| m_posts | Name & Title of Princi | | | | |
|---|---|---|---|---|---|
| | m_discrimination | 4.05 | | | |
| | m_used | 5 | | | |
| | m_occurence | 24 | | | |
| | m_words | Tokens | m_discrimination_token | m_used_token | m_occurence_token |
| | | Name | 1 | 1 | 1 |
| | | & | 1 | 1 | 1 |
| | | Title | 1 | 1 | 1 |
| | | of | 0.05 | 1 | 20 |
| | | Princi | 1 | 1 | 1 |
| | Name & Title of: | | | | |
| | m_discrimination | 4.047 | | | |
| | m_used | 5 | | | |
| | m_occurence | 25 | | | |
| | m_words | Tokens | m_discrimination_token | m_used_token | m_occurence_token |
| | | Name | 1 | 1 | 1 |
| | | & | 1 | 1 | 1 |
| | | Title | 1 | 1 | 1 |
| | | of | 0.047 | 1 | 21 |
| | | . | 1 | 1 | 1 |
| | ("Borrower") acknowledges receipt of the | | | | |
| | m_discrimination | 3.09 | | | |
| | m_used | 9 | | | |
| | m_occurence | 72 | | | |
| | m_words | Tokens | m_discrimination_token | m_used_token | m_occurence_token |
| | | ("Borrower") | 1 | 2 | 2 |
| | | acknowledges | 1 | 2 | 2 |
| | | receipt | 1 | 2 | 2 |
| | | of | 0.05 | 2 | 38 |
| | | the | 0.04 | 1 | 28 |

1700

FIG. 17B execute, acknowledge and deliver a guaranty of amounts lend by Lender under said promissory note.

Borrower: Roger Riley d/b/a General Holdings, LLC
Name [&] Title of Principal Borrower:

FIG. 18

| Confidence | Candidate |
|---|---|
| 1.00 | under said promissory note. Borrower: |
| 0.59 | Property to secure payment of the loan. The undersigned principal |
| 0.59 | agrees to cause the undersigned principal |
| 0.58 | against the Real Property to secure payment of the loan. The undersigned principal |
| 0.58 | Lender a promissory note and |
| 0.57 | Date: October 29, 2009 The undersigned General |
| 0.50 | Trustee's Deed. Borrower further agrees to cause the undersigned principal |
| 0.39 | payable to Executive ("Trustee"). The loan was |
| 0.38 | & Title of Principal Borrower: |
| 0.33 | mail to: TITAN FUNDING GROUP, LLC35W. Main |
| 0.29 | by check payable to Executive ("Trustee"). The loan was |

FIG. 19

| Confidence | Candidate |
|---|---|
| 1.00 | ("Borrower") acknowledges receipt of the |
| 0.93 | Name & Title of Principal |
| 0.81 | Name & Title of Principal |
| 0.41 | to Borrower to purchase the |
| 0.38 | to be recorded against the |
| 0.36 | of the proceeds of the |
| 0.36 | Group, LLC ("Lender") in the |
| 0.34 | to secure payment of the |
| 0.34 | with the recording of the |
| 0.34 | further agrees to cause the |
| 0.33 | to derive benefits from the |

*FIG. 20*

SYSTEM AND METHOD FOR EXTRACTING INFORMATION FROM DOCUMENTS

CROSS-REFERENCE TO RELATED APPLICATIONS

This application is a continuation of and claims the benefit of U.S. patent application Ser. No. 13/104,796 filed on May 10, 2011, which issued as U.S. Pat. No. 8,620,079 on Dec. 31, 2013, and which is hereby incorporated by reference in its entirety.

FIELD OF THE INVENTION

The present invention relates to document processing, and more particularly, some embodiments relate to extracting information from digital documents.

DESCRIPTION OF THE RELATED ART

For some time now, computers have had the ability to convert and store physical documents into digital documents. Generally, the conversion involves using a document scanner attached to a computer to scan the physical document and convert the resulting digital representation to a computer image file, such as, for example, a bitmap image (BMP) file, a Tagged Image File Format (TIFF) file, or a Joint Photographic Experts Group (JPEG) file. Following the scan, the image file of the document may be post-processed using optical character recognition (OCR) software, which locates characters within the image of the document (whether they be handwritten, typewritten, or printed) and translates them to computer-readable text. Subsequently, the resulting computer-readable text is typically saved to a computer document file, such as a text file, Portable Document File (PDF) or a Microsoft® Word document, from which the characters of the document can be readily recognized or modified using a computer.

With the world becoming increasingly digital, the desire to convert physical records to digital form accessible by computers has become commonplace. This is especially true in industries such as health care and real estate, where heavy reliance is placed on computer technologies such as document scanners and OCR software to convert the physical records into digital records. For example, in the real estate industry, both business and government entities are currently involved in converting physical real estate documents stored at public records offices to digital documents. Once converted, these digital documents, which may or may not be post-processed using OCR software, may be categorized by business entities to make them easier to locate and review during real estate transactions (e.g., when generating a real estate title report). Additionally, the conversion allows for information stored in field within these digital document (i.e., field content) to be readily extracted (e.g., grantor information from the grantor field in a deed).

FIG. 1 illustrates a diagram illustrating one conventional method by which business entities classify real estate-related digital documents and extract information from fields therein. As illustrated by the diagram, public documents at public records offices (10, 21) are either stored as physical documents 13 or as digital documents on a server 21. Presently, some real estate companies (e.g., title insurance companies) are aggregating real estate-related public documents from these sources (13, 21) and storing them on their own private database 19 for use during real estate transactions. Where the public documents are already stored at the public records offices as digital documents (e.g., 21), companies simply gain access to public records office's server 21 (i.e., via a feed) and electronically collect data via that access. However, where the public documents are only available in physical form, companies must first obtain the physical documents 13 from the public records office 10 and then convert them to digital documents using, for example, a document scanner 16. To make the digital documents retrieved from sources 13 or 21 computer-searchable, the digital documents are usually processed using OCR software to translate the text image into computer readable text. Additionally, digital and physical documents from the public records offices are usually uncategorized when retrieved or difficult to automatically extract information from, due to a lack of digital field delineations or varying field labels. As such, both digital and physical documents are typically analyzed by a human analyst to classify the document or to designate where field information is located within the document. For example, an analyst would determine that a digital real estate document is a deed of trust and designate which portion of the document provides the grantor information for the grantor field.

Though existing OCR technologies can perform limited levels of categorization of and field extraction from digital documents, they usually rely on a standardized document structure. Real estate documents usually have a document structure that varies jurisdiction-to-jurisdiction (e.g., country-to-country, state-to-state, county-to-county), or lack document structure altogether (e.g., handwritten real estate document). Consequently, it is has been difficult for computers to automatically ascertain via OCR alone what document classification certain real estate documents belong to, and what fields of the document contain what information. Companies therefore resort to conventional methods of document classification and field information extraction, which involve a large number of human analysts 27 reviewing the digital real estate documents on a computer 28 and electronically designating what document classifications 31 the digital real estate document belongs to, and what portions of the document contain fields of interest. Eventually, a user 33 (e.g., title analyst) interested in accessing or searching the categorized digital real estate documents or field information extracted therefrom can access them through a computer 34.

BRIEF SUMMARY OF EMBODIMENTS OF THE INVENTION

Various embodiments of the invention provide systems and methods for extracting information from digital documents, including physical documents that have been converted to digital documents. Specifically, some embodiments are configured to extract content (i.e., information) from a field of interest in a digital document by identifying a block of tokens before (i.e., a prior block) and a block of tokens after (i.e., a post block) the field contents to be extracted, where both the prior block and post block are known to be associated with the field type of the field (e.g., name, address, phone number, etc.) and assist in identifying the bounds of the field contents within the digital document. With respect to real estate documents, example field types include grantor, grantee, mortgagor, mortgagee, and meets and bounds of a parcel of land. In some embodiments, a prior block or a post block may be identified within a digital document by comparing sets of tokens within the digital document to sets of prior blocks and post blocks that known to be associated with a specific field type. For the purposes of this disclosure, the terms field information, field data, and field contents will be used interchangeably. Once prior and post blocks associated with a specific field type are identified within a digital document, the field information can be extracted by determining where the prior block ends and where the post block begins.

Various systems and methods may gather the knowledge associating prior blocks and post blocks to specific field types a posteriori, by training on a set of sample documents that contain markup information designating the location and identity of known fields. For example, some embodiments of the invention train on sample documents in which fields targeted for extraction (i.e., fields of interest) are pre-designated such that when the systems and methods train on the sample documents, the systems and methods use the designations to locate the prior blocks and post blocks surrounding the targeted field information and associate those prior and post blocks as example prior and post blocks that can indicate the presence and location of the field, its contents, and possibly its type (i.e., the systems or methods learn by example).

For some embodiments, the example prior blocks, the example post blocks, and other information related thereto may be stored in an extraction field template, which assists systems and methods in accordance with invention identify prior and post blocks in digital documents. In general, an extraction field template stores past training data that can be used in identifying prior and post blocks in documents needing data extraction. Depending on the embodiment, the extraction field template may store example prior blocks, example post blocks, and their related information according to the field type to which they are associated. For example, an extraction field template for a digital real estate document may contain a set of example prior blocks and example post blocks for identifying grantor fields and a different set of example prior blocks and example post blocks for identifying grantee fields. Additionally, in some embodiments, the example prior blocks, example post blocks, and their related information may be further associated with a particular document type (e.g., deed of trust or mortgage) or individual extraction field templates are associated with a particular document type or classification.

According to an embodiment of the invention, a method for extracting field data from a digital real estate document is provided, the method comprising: identifying a document classification for the digital real estate document; using an extraction field template for the document classification to identify in the digital real estate document a set of candidate prior blocks for a specific field type and a set of candidate post blocks for the specific field type; calculating a confidence score for a candidate prior block in the set of candidate prior blocks and a confidence score for a candidate post block in the set of candidate post blocks; selecting a best prior block from the set of candidate prior blocks based on the best prior block's confidence score and a best post block from the set of candidate post blocks based on the best post block's confidence score; and extracting a token block located between the best candidate prior block and the best candidate post block, wherein the token block is the field data and is associated with the specific field type.

In some embodiments, using the extraction field template to identify the set of candidate prior blocks and the set of candidate post blocks comprises: searching the digital real estate document for a select token, wherein the select token is selected from a set of tokens associated with the specific field type and the set of tokens is from the extraction field template; identifying an example prior block or an example post block in the extraction field template that contains the select token; and adding the example prior block to the set of candidate prior blocks or adding the example post block to the set of candidate post blocks.

Depending on the embodiment, the extraction field template may comprise an example prior block used to identify in the digital real estate document the set of candidate prior blocks, or an example post block used to identify in the digital real estate document the set of candidate post blocks. The extraction field template may further comprise example prior block information for the example prior block or example post block information for the example post block, wherein block information includes token frequency information, token occurrence information, token weight information, block occurrence information, or block weight information.

In other embodiments, calculating the confidence score for a candidate prior block and the confidence score for the candidate post block comprises: comparing a candidate prior block from the set of candidate prior blocks or a candidate post block from the set of candidate post blocks to a set of tokens from the digital real estate document, wherein the set of tokens contains at least one token in common with the candidate prior block or the candidate post block; and calculating the confidence score based on how well the candidate prior block or the candidate post block matches the set of tokens from the digital real estate document. In some such embodiments, comparing the candidate prior block or the candidate post block to the set of tokens comprises comparing a first token from the candidate prior block or the candidate post block to a second token from the set of tokens, wherein the comparing returns a confidence score that indicates how well the first and second tokens match. In other such embodiments, calculating the confidence score based on how well the candidate prior block or the candidate post block matches the set of tokens comprises using a set of coincidence scores to determine the confidence score of the candidate prior block or the candidate post block, wherein each coincidence score indicates how well a first token from the candidate prior block or the candidate post block matches a second token from the set of tokens.

In further embodiments, the best prior block has a highest confidence score of any other prior block in the set of candidate prior blocks, and the best post block has a highest confidence score of any other post block in the set of candidate post blocks. In yet further embodiments, the best prior block has a confidence score that meets or exceeds a threshold score, and the best post block has a confidence score that meets or exceeds the threshold score.

In other embodiments, calculating the confidence score for a candidate prior block or the confidence score for the candidate post block comprises: for each token in a candidate block, where the candidate block is either the prior block or the post block: comparing a token from the candidate block to a second token in the digital real estate document to determine a coefficient of coincidence, wherein the coefficient of coincidence represents how well the token matches the second token; obtaining a weight for the token from the candidate block, wherein the weight for the token is in relation to the candidate block (which represents the impact of this token match on matching the entire candidate block) and the weight for the token is obtained from the extraction field template; and updating the confidence score for the candidate block with the multiplication product of the coefficient of coincidence and the weight for the token.

With respect to training, in some embodiments, training the extraction field template involves a marked-up sample document (also referred to herein as "marked-up sample document") and comprises: using markup information in the marked-up sample document to locate an example prior block for the specific field type or an example post block for the specific field type; converting the example prior block to example prior block information or the example post block to example post block information wherein example prior block information or example post block information includes token frequency information, token occurrence information, token weight information, and block weight information; and updating the token weight information for the example prior block or in the example post block based on token frequency information and token occurrence information.

In some embodiments, calculating or updating the token weight information comprises calculating or updating a token weight for each token within the example prior block or the example post block. In other embodiments, training further comprises calculating or updating the block weight information based on the token weight information. In further embodiments, training further comprises saving the example prior block or the example prior block to the extraction field template; and associating the example prior block or the example post block with the specific field type.

In some embodiments, calculating or updating the token weight information is based on maximizing a confidence value using an optimization algorithm, wherein the confidence value is a measure of accuracy based on frequency of tokens found during training. In other embodiments, calculating or updating the token weight information is based on maximizing a score value using an optimization algorithm, wherein the score value is a measure of extraction accuracy based on what is extracted versus what is marked-up.

According to further embodiments, various operations described above are implemented using a computer. For example, some embodiments provide for a computer program product or computer system comprising a computer useable medium having computer program code or instructions embodied therein for controlling a computing system in accordance with aspects of the invention as described herein.

It should be noted that although the present is described herein with respect to digital real estate documents, one of ordinary skill in the art reading this description would fully appreciate and understand that embodiments of the present invention could be used with documents from other fields and industries not pertaining to real estate. For example, embodiments of the present invention could be utilized on digital documents relating to the medical field or the finance industry.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIGS. 7-15 illustrate an example of an extraction field template being trained in accordance with one embodiment of the systems and methods described herein.

FIGS. 16-20 illustrate an example of field information being extracted from a digital real estate document using an extraction field template in accordance with one embodiment of the systems and methods described herein.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE
EMBODIMENTS OF THE INVENTION

Embodiments of the present invention are directed toward a system and method for extracting information (i.e., contents) from fields of digital documents. Various embodiments of the invention provide systems and methods for extracting information from fields within documents, including physical documents that have been converted to digital documents.

Depending on the embodiment and the digital documents, the digital documents discussed herein may be received in a variety computer file formats, including, for example, an image file, a PDF file, or a Microsoft® Word document file. In some embodiments, where the digital document is an image file and the image file has yet to be processed by OCR software, such OCR processing can be implemented to take place before operations in accordance with the invention are performed. Additionally, once a digital document has computer readable text (e.g., via OCR software, or inherently due to the file format), digital documents may be partitioned into a sets of tokens (also, referred to as "tokenization") for analysis, training, and comparison purposes. For example, digital documents may be tokenized in order to obtain prior and post blocks in accordance with some embodiments of the invention, or compare prior and post blocks to document tokens in accordance with some embodiments of the invention. A token may comprise any word, symbol, character or character string, expression or phrase that is contained within a digital document. For example, a phrase such as "LOT 17 OF TRACT 19778, IN THE CITY OF PASADENA" may be tokenized to "LOT," "17," "OF," "TRACT," "19778," "IN," "THE," "CITY," "OF," and "PASADENA." Other methods of tokenization are also possible, and depend on the configuration of the specific embodiment.

Figure 1:
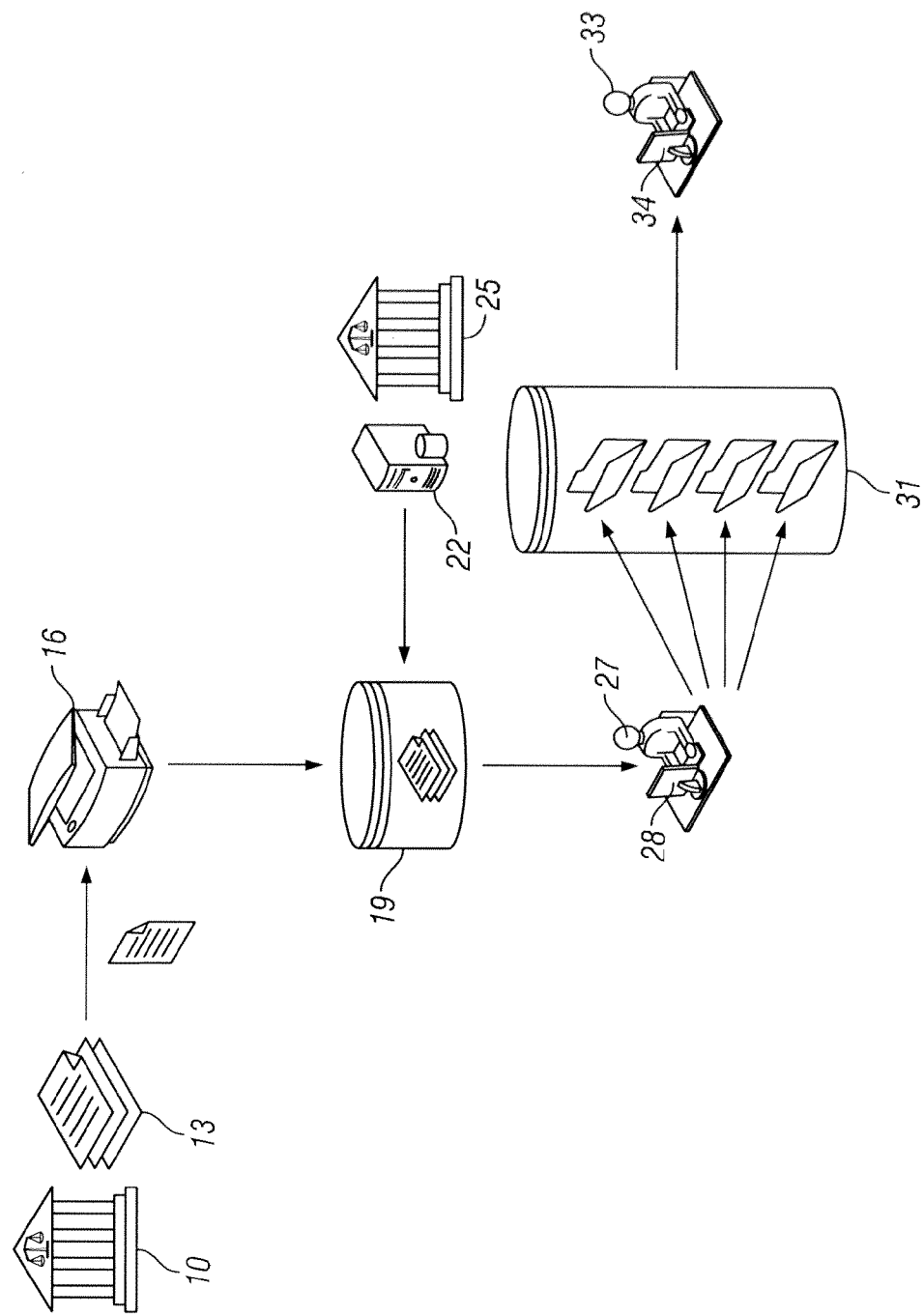
FIG. 1 is a flowchart illustrating a conventional method for classifying and analyzing real-estate-related public documents for data extraction.
Figure 2:
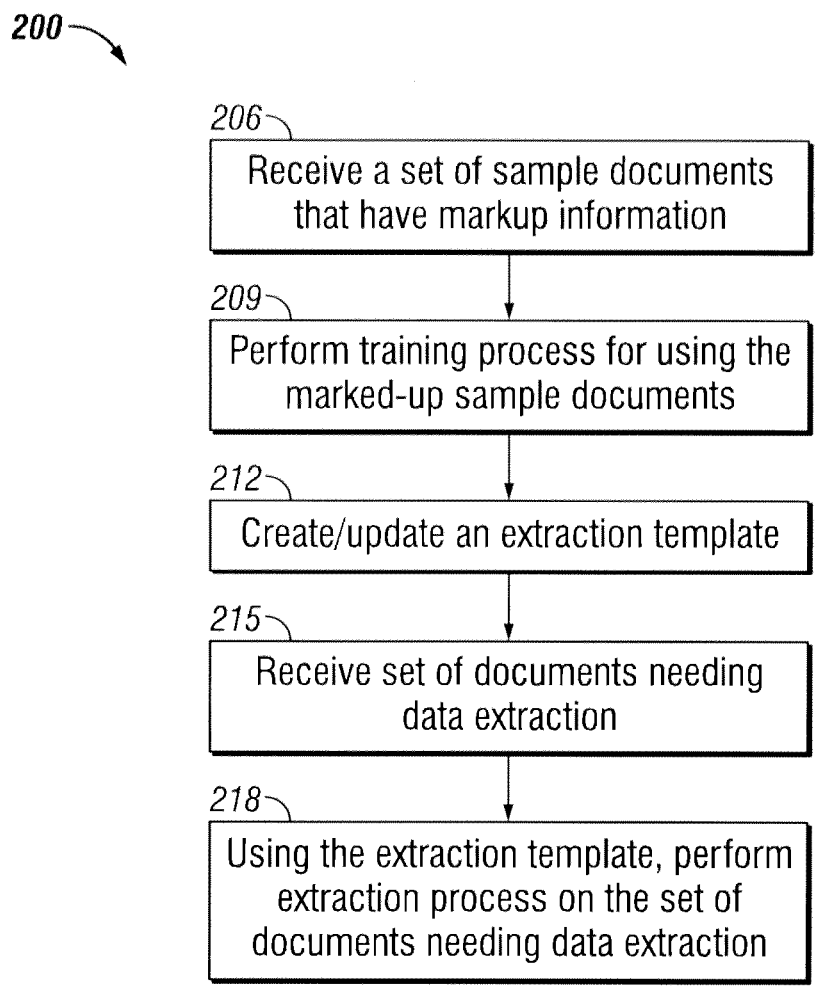
FIG. 2 is a flowchart illustrating an example method for training and using extraction field templates to extract information from fields within a digital document in accordance with one embodiment of the systems and methods described herein.

FIG. 2 is a flowchart illustrating an example method 200 for extracting information from a field in a document in accordance with one embodiment of the systems and methods described herein. More specifically, method 200 provides a general overview of how one embodiment of the invention is performed. Method 200 comprises of a training process, illustrated by operations 206-212, and a extraction process, illustrated by operations 215 and 218.

Referring now to FIG. 2, method 200 begins at operation 206 by receiving a set of sample digital documents that have been reviewed and marked-up. These marked-up digital documents will serve to train the method on the example prior blocks and example post blocks surrounding the designated contents of fields (also referred herein to as "baselines"). The method then associates example prior blocks and example post blocks with the fields types associated with those designated fields. Depending on the embodiment, each marked-up digital document contains markup information designating the location of one or more fields that can be targeted for training by the method. The markup information may also identify a field type for each of the designated fields. The sample digital document may be marked-up by human analysts that review the contents of the sample document and use a computer terminal to designate the fields of the sample document and, possibly, the field type. For example, a human analyst may designate fields within a sample digital document by drawing a rectangle around (i.e., markup) the contents of a field (i.e., baseline) that needs to be extracted for a given field in the sample document. Such designations results in markup information that is then stored in a marked-up digital document (also referred to herein as "marked-up digital document").

Depending on the embodiment, the sample digital documents reviewed and marked-up by human analysts may be in one of a variety computer file formats, including an image file (e.g., BMP, JPEG, TIFF), a PDF file, or a Microsoft® Word document file. Where the sample digital document is an image file and the image file has yet to be processed by OCR software, such OCR processing would occur before a human analyst would markup the sample digital document in order to make its text computer readable.

In some instances, where the classification of a digital document has not already been determined (e.g., automatically by some other system or method), the human analysts may also identify a document classification for the sample digital document during the document's review. This is important for some embodiments where the example prior block, the example prior post block, and their associated information are stored according to document classification. For example, where the example prior block, the example prior post block, and their associated information are stored in extraction field templates, each extraction field template can be associated with a particular document classification (e.g., dead of trust, lien). The example prior block, the example prior post block, and their associated information may be further stored within the extraction field template according to the field type they are associated with (e.g., grantor field, mortgagee field).

Once method 200 receives the set of marked-up digital documents, at operation 209 the training process begins on the marked-up digital documents. As detailed herein, in some embodiments, the training process comprises the method analyzing fields designated in the marked-up digital document, and learning of which prior blocks and post blocks surround such designated fields. These learned prior blocks and post blocks (also, referred herein as "example prior blocks" and "example post blocks"), once stored and associated with the field type, later serve as examples that can be used to identify prior blocks and post blocks in documents needing field information extraction. Additionally, where a document classification of the marked-up digital document is known, the association between the example prior and post blocks and the document classification may also be stored (or alternatively, the prior and post blocks are stored in an extraction field template associated with the document classification).

At operation 212, method 200 creates a new extraction field template to store the example prior and post blocks discovered during operation 209. Alternatively, where an extraction field template already exists, the extraction field template is updated with the example prior and post blocks discovered during operation 209. In some embodiments, when the extraction field template is updated and the example prior and post blocks do not already exist in the extraction field template, the example prior, example post blocks, and their related information are added to the extraction field template. However, where the extraction field template is updated and the example prior and post blocks already exist in the extraction field template, the information relating to the example prior and post blocks is merely updated. Information relating to the example prior and post blocks include, for example, a list (e.g., set) of tokens contained in a given block, the number of occurrences of the token within a given block, the frequency of token occurrences per an encountered document, the frequency of token occurrences per a page of a document, the number times a block has been encountered during training (or during field information extraction), the weight/impact of each token in identifying a block, and the weight of a prior block or a post block in identifying a field and field content.

Following the creation/update of an extraction field template, at operation 215 method 200 receives a set of digital documents that need data extraction. As noted, depending on the embodiment, the received digital documents may be in one of a variety computer file formats, including an image file (e.g., BMP, JPEG, TIFF), a PDF file, or a Microsoft® Word document file. Where the digital document is an image file and the image file has yet to be processed by OCR software, such OCR processing could take place before method 200 proceeds in order to make the text in the digital document computer readable. More with respect to training processes is described later with respect to FIGS. 3 and 4, which provide flowcharts illustrating example methods for training extraction field templates in accordance with embodiments of the present invention.

At operation 218, method 200 uses the extraction field template to perform the extraction process on the set of digital documents received at operation 215. As described herein, in embodiments where the extraction field template is associated with a specific document classification (e.g., a lien, mortgage), each digital document in the set is processed using an extraction field template that corresponds to the digital document's classification. Additionally, in some such embodiments, when the document classification of a digital document within the set is not known in advance of operation 218, method 200 may use a system or method to classify the digital document before it is processed for extraction.

During operation 218, method 200 uses the example prior blocks, example post blocks, and their related information, which stored in an extraction field template, to identify prior and post blocks in each of the digital document, and identify contents of fields (and field types) surrounded by such prior and post blocks. More specifically, in some embodiments, the example prior blocks, example post blocks, and their related information, which are stored in an extraction field template, are used to identify candidate prior and post blocks in each of the digital document, determine which candidate prior and post blocks best indicate the presence of a field (or a field of a specific field type), and use those best prior and post blocks to identify contents of fields. For example, the candidate prior and post blocks that best indicate the presence of a field may be determined based on a block's ability over other blocks to indicate the presence of a field (i.e., weight of the block), and the block's ability over other blocks to be identified based on the presence of its tokens in a document (i.e., weight of each token in identifying a block). Once the fields are identified (with or without field type), the information (i.e., content) contained within those fields can be readily extracted. More with respect to extraction processes is described later with respect to FIGS. 5, 6A, and 6B, which provide flowcharts illustrating example methods for extracting information (i.e., data) from fields within a digital document in accordance with embodiments of the present invention.

It should be noted that depending on the embodiment, the extraction process may involve using an extraction field template to extract data from all the pages of a digital document all at once, or to extract data from the digital document one page at a time. Additionally, in further embodiments, the extraction process may involve using an extraction field template to extract data from a digital document one field type at a time, or to extract data from all field types in the digital document all at once.

Figure 3:
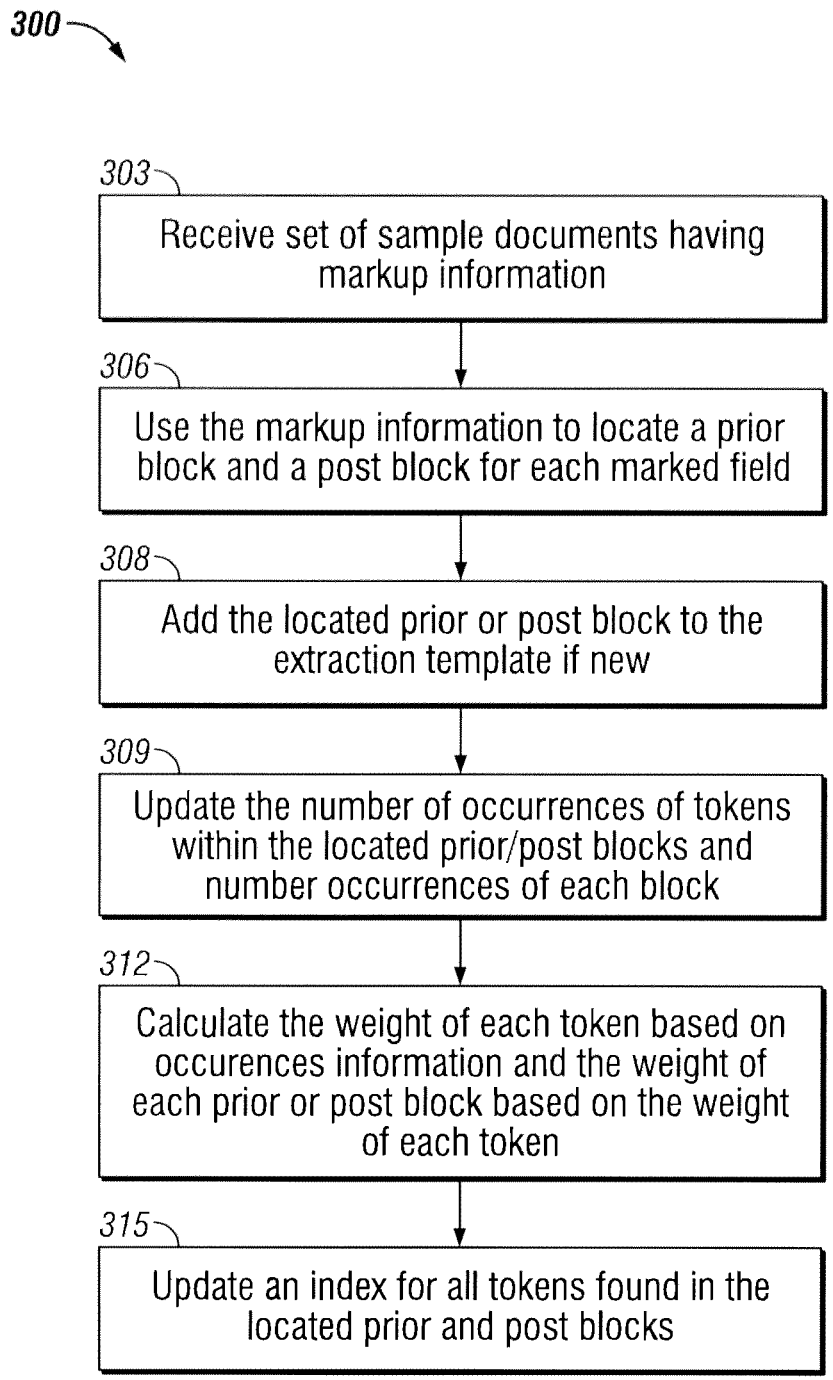
FIG. 3 is a flowchart illustrating an example method for training extraction field templates in accordance with one embodiment of the systems and methods described herein.

FIG. 3 is a flowchart illustrating an example method 300 for training extraction field templates in accordance with one embodiment of the systems and methods described herein. In some embodiments, method 300 may be performed when performing a training process using marked-up digital documents and updating an extraction field template (e.g., operations 209 and 212). In general, method 300 trains extraction field templates by finding prior and post blocks for designated contents of fields (i.e., baselines) in marked-up digital document; updating occurrences of each prior and post block located; building an index of all the tokens in the prior and post blocks found during the training process; for each prior or post block, calculating the discriminating power (i.e., weight) of each of its tokens in identifying the block; and based on the discriminating power of its tokens, calculating the discriminating power of each block in identifying a field or a field type. In alternative embodiments, rather than marking up the field content, the field may be designated by marking up the prior and post block that should be trained on.

Method 300 begins at operation 303 by receiving a set of marked-up digital documents having markup information. For some embodiments, it would be beneficial to have a training set of marked-up digital documents that includes a large number of documents, and represents a variety of document styles and wording for a given document classification (e.g., mortgage, deed of trust), as this would provide a robust variety of example prior and post blocks to train on.

Depending on the embodiment, if the marked-up digital document has a specific document classification, this document classification may be indicated to method 300 so that the training information can be appropriately stored in an extraction field template (e.g., in the extraction field template corresponding to the document classification). Additionally, in some embodiments, the marked-up digital documents received may be marked-up for only a single field type, or marked-up for multiple field types (with the field designations indicating location and the field type of each field). In some such embodiments, when the marked-up digital documents are marked-up for multiple field types, method 300 may be instructed to only train on a subset of the field types designated in the marked-up digital document and to exclude the rest. Alternatively, when the marked-up digital documents are marked-up for a single field type but the field designations do not indicate a field type, method 300 may be informed of the field type contained in the marked-up digital document before training begins.

As described herein, the marked-up digital documents contain markups that designate the contents of fields (of interest) targeted for extraction training. Accordingly, at operation 306 method 300 uses the markup information to locate example prior blocks and example post blocks that surround the designated fields in the marked-up digital documents. Hereafter, when referring to a designated field within a marked-up digital document, it will be understood the designated field referring to a field designated by the designation of field contents. These example prior blocks and the example post blocks are subsequently processed by operations 308-318. More with respect to locating prior and post blocks is discussed later FIG. 4, which provides a flowchart illustrating an example method for locating blocks for training extraction field templates in accordance with one embodiment of the invention.

Before describing operations 308-318, it should be noted that method 300 may store the results of operations 308-318 according to the field type indicated by a designated field and/or the document classification indicated for the marked-up digital document. For example, where the document classification of the marked-up digital document is a lien, the results of operations 309-318 will be stored in the extraction field template associated with liens. Or, for example, where the designated field is the grantor field, the results of operations 308-318 will be associated with the grantor field in the extraction field template.

After the prior and post blocks have been located using the markup information, at operation 308 method 300 adds the located prior and post blocks to the extraction field template as example prior and post blocks if they do not already exist. In order to check if they already exist, method 300 may compare the currently located prior or post block with an example prior and post block encountered in past training sessions and stored in the extraction field template. If a located prior or post block matches exactly with an example prior or post block, or if the difference between the located block and the example block is sufficient to be considered a match, then the example prior or post block will be updated in the extraction field template, thereby avoiding the addition of the located prior or post block to the extraction field template as a new example block.

At operation 309, method 300 updates prior block occurrence information and post block occurrence information in the extraction field template according to the results of operation 306 in view of the results from past training sessions. More specifically, operation 309 increments the number of times the located prior block or the located post block has been found to be used during training. Additionally, operation 309 increments the number of times that each token of each located prior/post block (i) has appeared in a training document (i.e., marked-up digital document) or a page of a training document, and (ii) has been appeared in the prior/post block during training.

From this (token and block) occurrence information, method 300 then calculates the weight (i.e. discriminating power) of each token at operation 312. Depending on the embodiment, the weight of each token may indicate that token's ability to identify that a set of tokens within a document is associated with a particular prior block or post block. For example, where frequency of a token appearing in a first prior block based on past training sessions is $F_b$, and frequency of the same token appearing on pages of training document (i.e., sample marked-up digital documents) based on past training sessions is $F_p$, the token weight (i.e., discrimination power) may be the ratio $F_b/F_p$. Accordingly, more occurrences of a token on pages of a document decreases token's weight while more occurrences of a token in a prior or post block increases the tokens weight. In some embodiments, the sum token weights for a given example prior or post block determines the prior or post block's weight.

In order to assist with locating prior and post blocks during the extraction process, method 300 may also update an index of tokens with tokens from the prior and post blocks located during operation 315. In some embodiments, this token index can used to determine which potential prior and post blocks contain a select token. In other embodiments, this token index can be used to locate potential and candidate prior blocks within a digital document given a token of the digital document.

For example, when processing a digital document for field information extraction, the tokens within the index can be used to locate potential positions of prior and post blocks within the digital document, obtain a list of potential prior and post blocks that may be located at those potential positions, and then compare tokens from the list of potential prior and post blocks with tokens at or around that potential position in the digital document, thereby identifying candidate prior and post blocks within the digital document.

Depending on the embodiment, the extraction field template may contain multiple token indices, each index being associated with a particular field type. As such, when a particular field type is being sought in a digital document, the appropriate token index would be utilized to find potential positions of prior and post blocks in the digital document, and to identify candidate prior and post blocks that may be located at those potential positions. More with respect to use of token indices is discussed later with respect to FIGS. 6A and 6B, which provide a flowchart of an example method for locating blocks for extracting information from fields in a digital document in accordance with one embodiment of the present invention.

Figure 4:
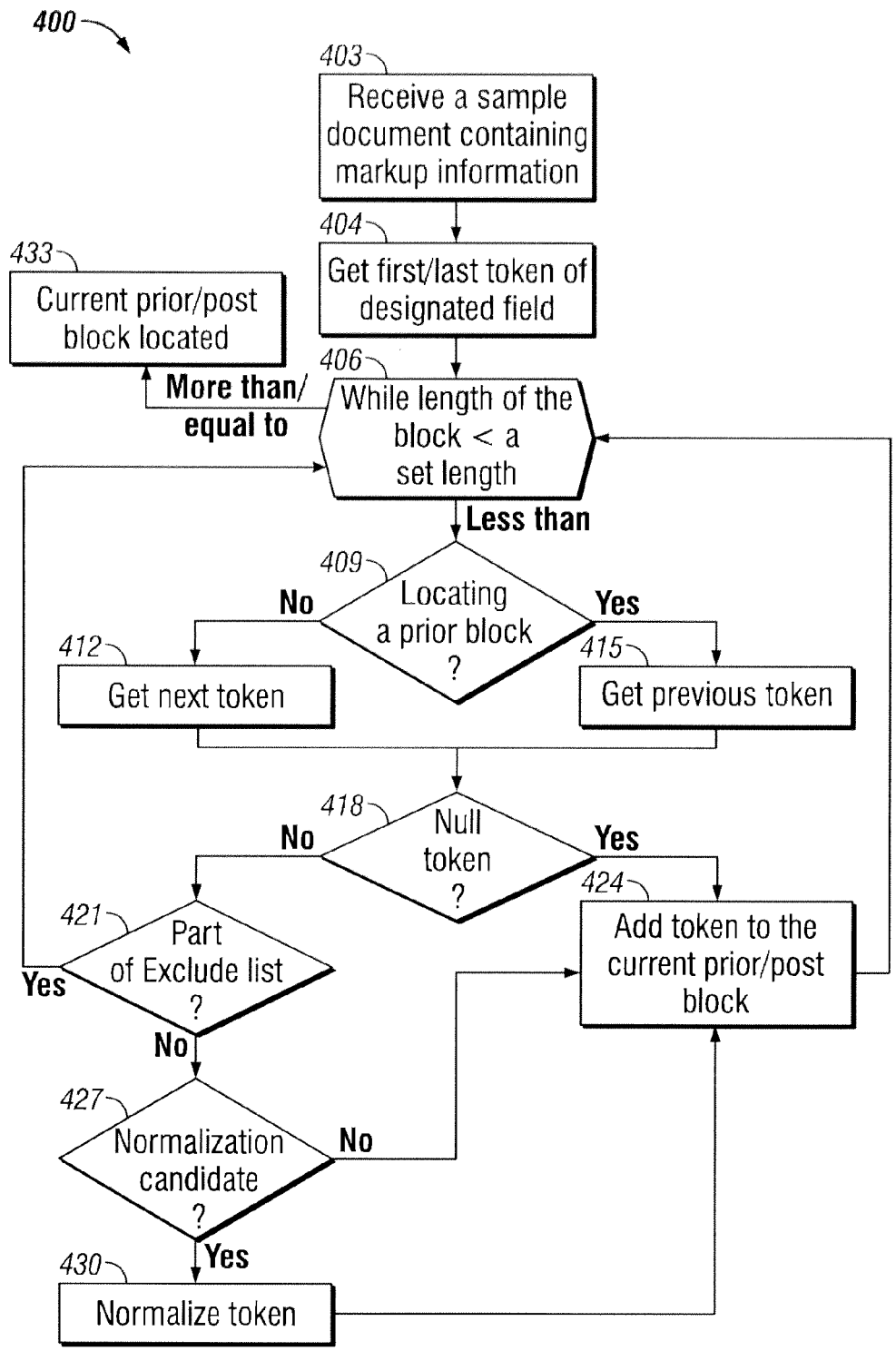
FIG. 4 is a flowchart illustrating an example method for locating blocks for training extraction field templates in accordance with one embodiment of the systems and methods described herein.

FIG. 4 is a flowchart illustrating an example method 400 for locating blocks for training extraction field templates in accordance with one embodiment of the systems and methods described herein. In some embodiments, method 400 is performed when using markup information in a marked-up digital document to locate example prior and post blocks for each designated field (i.e., for each designation of field contents) (e.g., operation 306). Method 400 begins at operation 403, where a marked-up digital document having markup information designated fields is received.

Once the first and last token of the designated field are obtained at operation 404, method 400 begins to obtain tokens of interest directly before and after the field contents designated by the markup information (i.e., baseline). The tokens of interest before the designated field will be considered the or block or block the designated field contents, and those after the designated field contents will be considered the post block for the designated field.

Accordingly, when method 400 is obtaining a prior block with respect to a designated field, method 400 begins obtaining tokens proceeding the first token of the designated field (415) until the length of the current prior block reaches a predetermined length (406). Conversely, when method 400 is obtaining a post block with respect to a designated field, method 400 begins obtaining tokens following the last token of the designated field (415) until the length of the current prior block reaches a predetermined length (406). As illustrated, before a token is added to the current prior block or current post block, method 400 checks if the token is a null token (418) (e.g., a space), if the token that is a member of the excluded list (421), and if the token should be normalized (427).

In some embodiments, a token within prior and post blocks may be normalized to optimize their ability to located and identified within digital documents during an extraction process. For example, a number within a block can be normalized by replacing it with a token marker "[[NUMBER]]," a date within a block can be normalized by replacing it with a token marker "[[DATE]]," a city within a block can be normalized by replacing it with a token marker "[[CITY]]," and a state within a block can be normalized by replacing it with a token marker "[[STATE]]." Additionally, in some instances, certain tokens can be normalized by merging them into a single token. For example, tokens "THERE IS" can be replaced with "THEREIS." Further methods of normalization may include ignoring tokens within a prior or post block. For example, the token patterns removed or ignored may be a conjunction, a linking verb, a preposition, or an article. It should be understood that where an embodiment normalizes token within a located prior or post block during training, that such normalization is taken into account during the extraction process, when prior and post blocks are being located and identified in a digital document needing data extraction.

Continuing with method 400, where a token is found to be null (418) or is determined not to be a candidate for normalization (427), the token is added to the current prior block or post block (424). However, where the token is a member of an excluded list of tokens (421), the token is skipped and method 400 continues with the next token (i.e., preceding token for obtaining the prior block, following token for obtaining the post block). Depending on the embodiment, an excluded list token may be a token skipped for normalization purposes. In other embodiments, an excluded list token may be characters that method 400 wants to avoid adding to the current prior or post block (e.g., "$," "&,") or may be sections of the marked-up digital document that have been designated as being excluded (e.g., markup information designating coordinates of a rectangular area that should be avoided when locating prior and post blocks from a marked-up digital document; this may be designated by a human analysts when they designate fields).

Where a token is considered to be normalization candidate (427), the token is appropriately normalized (430) and the normalized version of the token is added to the current prior or post block. Once the block reaches a predetermined length (406), a current block is determined to be located (433) and is returned to the method calling method 400. In some embodiments, method 400 is performed once to find the prior block with respect to a designated field, and performed again to find the post block with respect to the designated field.

Figure 5:
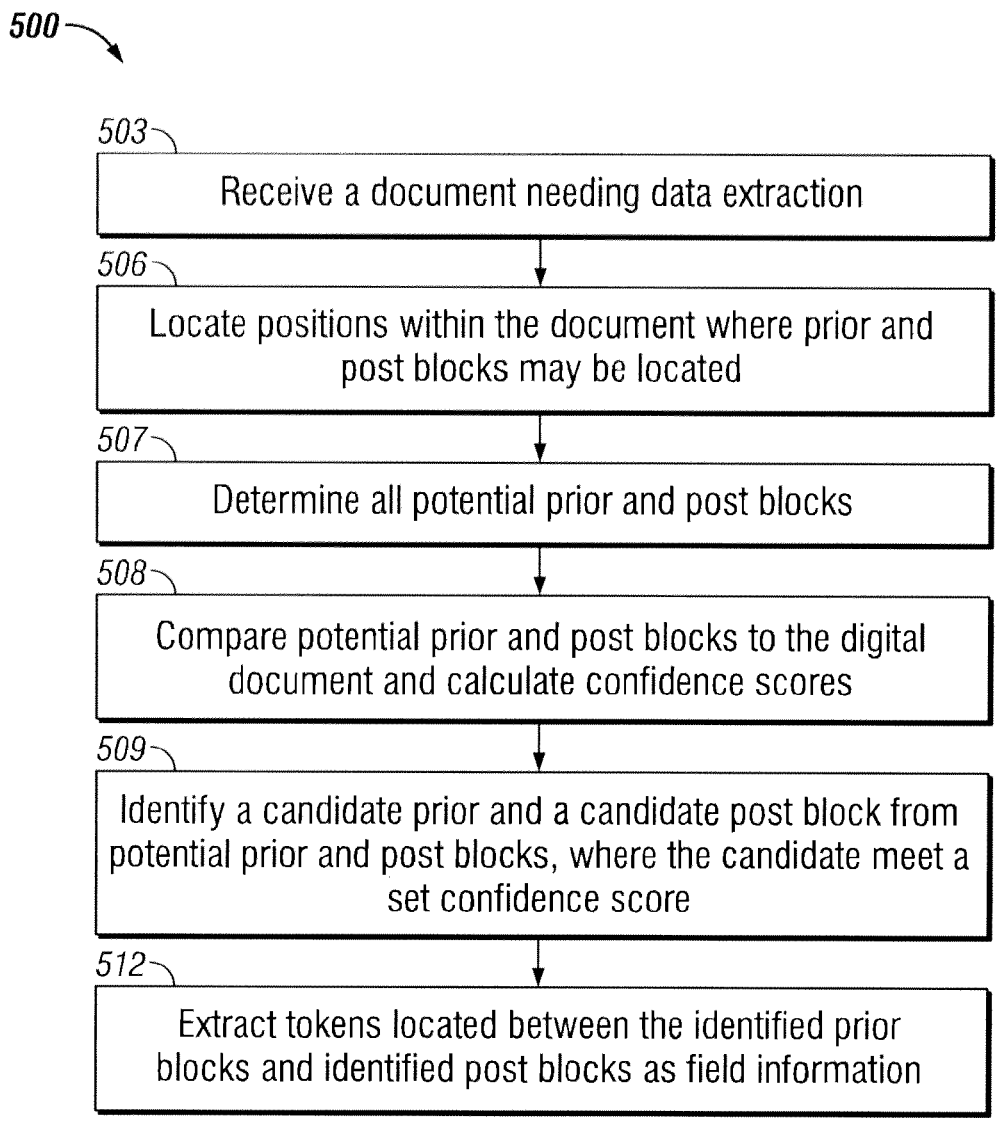
FIG. 5 is a flowchart illustrating an example method for extracting information from fields in a digital document in accordance with one embodiment of the systems and methods described herein.

FIG. 5 is a flowchart illustrating an example method 500 for extracting information from fields in a digital document in accordance with one embodiment of the present invention. In some embodiments, method 500 is performed when using an extraction field template to perform an extraction on a digital document in need of field information (i.e., data) extraction (e.g., operation 218). Method 500 begins with operation 503, where a digital document needing data extraction is received. As described herein, depending on the embodiment, the received digital document may be in one of a variety computer file formats, including an image file (e.g., BMP, JPEG, TIFF), a PDF file, or a Microsoft® Word document file. Additionally, where the digital document is an image file and the image file has yet to be processed by OCR software, such OCR processing would take place before method 500 can proceed in order to make the text in the digital document computer readable.

In some embodiments, when receiving the digital document for data extraction, method 500 may be instructed to locate a single field type within the digital document or multiple field types within the digital document. In further embodiments, the document classification of the received digital document may be disclosed to the method 500 such that the method will utilize an extraction field template that corresponds to that identified document classification when trying to locate and identify prior blocks and post blocks in the digital document. For example, where the received digital document is a mortgage document, method 500 would utilize an extraction field template associated with mortgage documents to locate and identify prior blocks and post blocks in the digital document.

Continuing with operation 506, method 500 locates all potential positions within the digital document where prior or post blocks may be located and then, at operation 507, determines all potential prior and post blocks within the digital document. As noted before, depending on the embodiment, example prior blocks, example post blocks, and related block information from an extraction field template may be utilized to locate all potential positions within the digital document where prior or post blocks may be located, and determine all potential prior and post blocks at those potential positions. For instance, related block information may include a token index that lists tokens found in the example prior and post blocks contained within the example template. In some embodiments, the token index may be associated with a particular field type such that the tokens contained therein are only those tokens found in example prior and post blocks associated with the particular field type.

Embodiments may use the token index to locate potential positions in the digital document by searching in the digital document for tokens from the index and storing these locations as potential positions for prior and post blocks may exist. Then, for every token from the token index that has been found to exist in the digital document, embodiments may further use the token index to determine which example prior and post blocks within the extraction field template contain each token located; the example prior and post blocks that contain the located token are considered to be potential prior and post blocks of the digital document.

Once the potential positions are located and the potential prior and post blocks determined, at operation 508 method 500 compares potential prior and potential post blocks from operation 507 with tokens from the digital document; the tokens from the digital document compared those located at around the potential positions located in operation 506.

By comparing the potential prior and post blocks to the digital document, operation 508 results in confidence scores for each potential prior block and potential post block, where the confidence score indicates how well the block matches the tokens from the digital document. As described herein, the confidence score for a comparison can be determined from block information contained in an extraction field template. For example, a comparison may use token frequency information, token occurrence information, or token weight information associated with a potential prior or post block to calculate a confidence score for that potential prior or post block when it is compared to tokens of the digital document. In some embodiments, the token comparison and confidence scoring are facilitated by a comparison function based on the Needleman-Wunsch algorithm, which is well known and used in the field of genetics to perform comparison, alignment and scoring between two sequences.

It should be noted that depending on the embodiment, the confidence score from a comparison may need to meet a specific threshold before a potential prior or post block is considered to be a candidate prior or post block.

Once scores for each candidate prior and post block have been calculated by operation 508, at operation 509 method 500 identifies a candidate prior block and a candidate post block from the potential prior and post blocks respectively. Specifically, these candidate blocks are selected based on their confidence score. For example, method 500 may identify a potential prior block having the highest confidence score as the candidate prior block, and select a potential post block having the highest confidence score as the candidate post block. In other embodiments, a set of candidate prior blocks and a set of post blocks may be identified from the potential prior and post blocks based on whether the block meets or exceeds a predetermined confidence score.

Subsequent to identifying a candidate prior block and a candidate post block at operation 509, method 500 concludes with operation 512, where tokens located between the identified prior block and identified post block are extracted from the digital document as contents of a field (i.e., field information). As noted before, where the identified prior block and the identified post block are associated with a field type, the field content extracted from between the identified prior and post blocks would be associated with the same field type.

As described herein, in some embodiments, method 500 is performed on a single document at time with respect to a single field type (as opposed to multiple field types). Then, when method 500 needs to be performed on the same digital document but with respect to another field type, method 500 must be re-performed on the digital document. Accordingly, in some embodiments, method 500 may be performed once on a digital document using an extraction field template for each field type contained in the extraction field template. Further, the extraction field template applied to the digital document may be based on the document classification of the digital document.

Figure 6A:
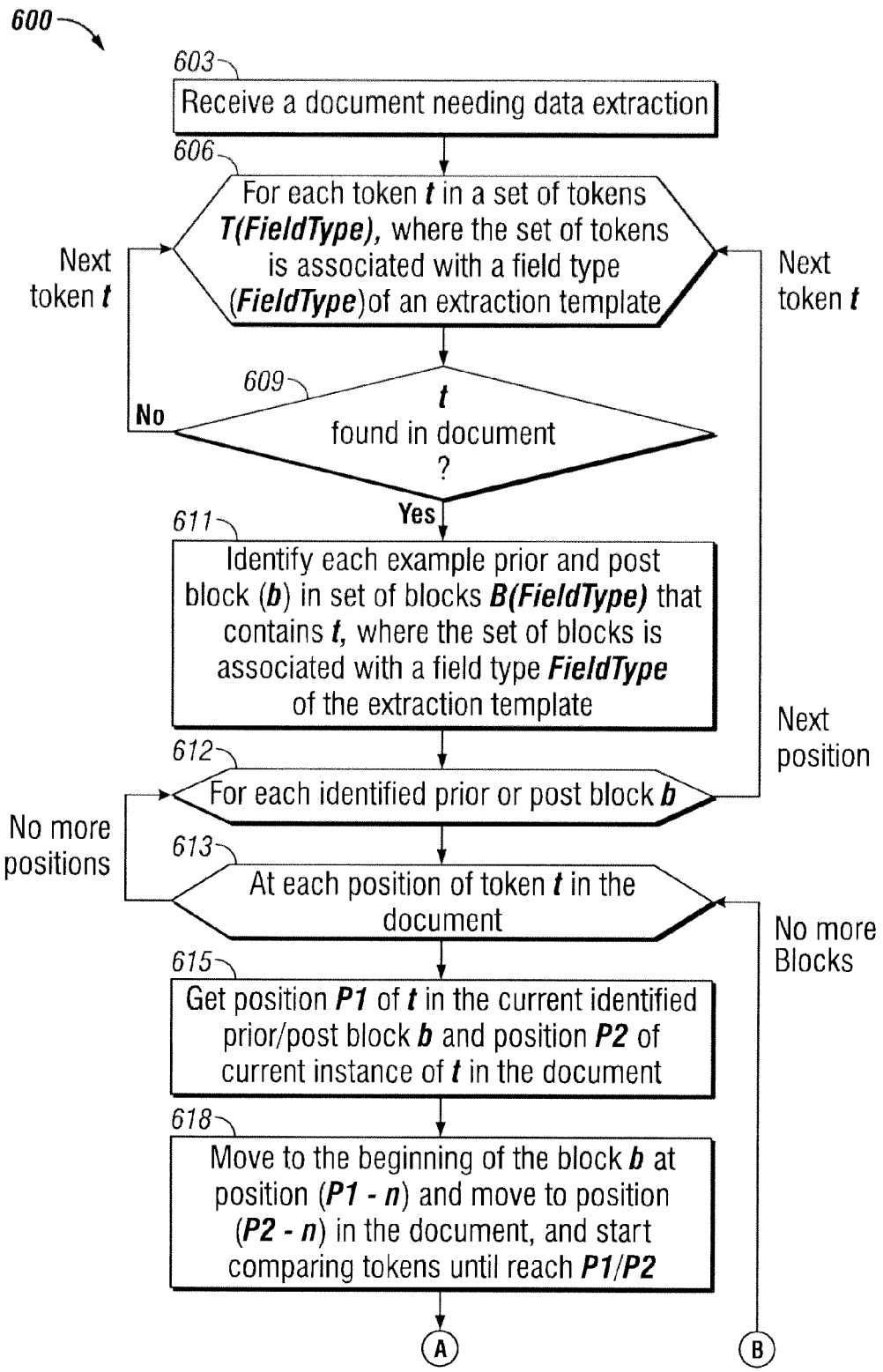
FIGS. 6A and 6B illustrate a flowchart of an example method for locating blocks for extracting information (i.e., content) from fields in a digital document in accordance with one embodiment of the systems and methods described herein.
Figure 6B:
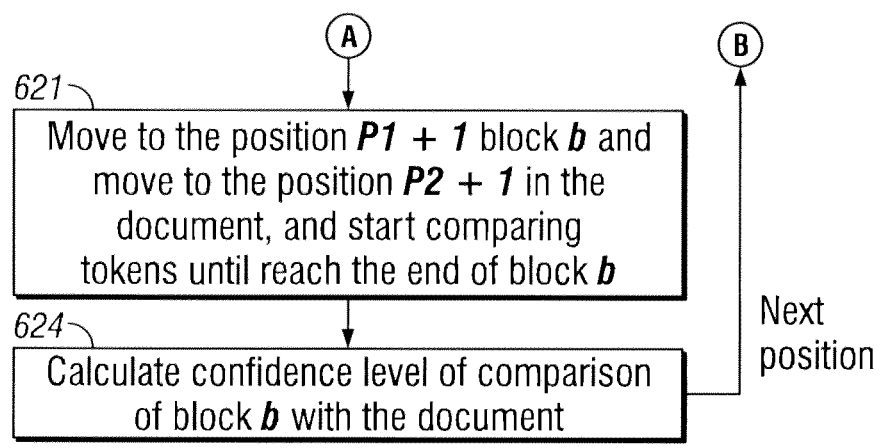

FIGS. 6A and 6B illustrate a flowchart of an example method 600 for locating blocks for extracting content from fields in a digital document in accordance with one embodiment of the present invention. In some embodiments, method 600 covers the operations of locating potential positions in a digital document of prior and post blocks, determining which potential prior and post blocks may be located at those potential positions, and comparing identified potential prior and post blocks against the digital document, thereby producing a confidence score (e.g., 506-508).

Method 600 begins by receiving a digital document at operation 603. As described herein, depending on the embodiment, the received digital document may be in one of a variety computer file formats, including an image file (e.g., BMP, JPEG, TIFF), a PDF file, or a Microsoft® Word document file. Additionally, where the digital document is an image file and the image file has yet to be processed by OCR software, such OCR processing would take place before method 600 can proceed in order to make the text in the digital document computer readable.

Upon receiving the digital document, operation 606 searches the digital document for each token t in a set of token T(FieldType) where T(FieldType) is the set of tokens is associated with a particular field type (i.e., FieldType) in an extraction field template. The specified field type (i.e., FieldType) is the field type sought to be extracted from the digital document. As described herein, in some embodiments, the set of tokens may be implemented as an index of tokens, which lists all the tokens found in example prior and post blocks (in an extraction field template) and in which T(FieldType) is a subset of tokens associated to a particular field type.

For each token t found in the digital document (609), method 600 performs the operations 611-624. Where token t is not found in the digital document, method 600 precedes with the next token in T(FieldType). Each location in the digital document where a token t is found represents the location of a potential field in the digital document from which field contents can be extracted.

At operation 611, method 600 identifies each example prior and post block b in the set of blocks B(FieldType) that contains token t, where B(FieldType) is the set of blocks in the extraction field template associated with the same field type (i.e., FieldType) as used in operation 606. According to some embodiments, the identified example prior and post blocks serve as potential prior and post blocks that may be located within the digital document. Once the potential prior and post blocks have been identified (611), method 600 performs operations 613-624 for each block b and operations 615-624 for each position of token t in the digital document.

Accordingly, for each identified prior or post block b (612), at each position of token t (613), at operation 615 method 600 obtains a position P1 of token t in the current identified prior or post block b and a position P2 of the current instance of token t in the digital document. Method 600 continues by comparing tokens of the current block b that are to the left of token t (i.e., left of P1) to the tokens in the digital document that are to the left of token t (i.e., left of P2). Specifically, in operation 618, method 600 moves to the beginning of the current block b (which is at position P1−n), moves to position P2−n in the digital document (so that method 600 is comparing the same amount of tokens to the left of token t), and begins comparing the tokens of the current block b with tokens of the digital document until token t is reached (i.e., until P1 and P2 is reached). At operation 621, this comparison between current block b and the digital document is repeated but for tokens to the right of token t (i.e., left of P1 in the current identified prior or post block; left of P2 in the digital document). Based on the comparisons of operation 618 and 621, method 600 calculates an overall confidence score for the comparison at operation 624, where the confidence score indicates how well the current block b matched the tokens of the digital document around the current position of t. As described herein, in some embodiments, a comparison function based on the Needleman-Wunsch algorithm may be utilized to perform the token comparisons and calculate coincidence scores from each token comparison, which are then used to calculate the confidence score of a candidate prior or post block.

After the confidence score is obtained at operation 624, method 600 moves to the next position of token t in the digital document, and repeats operations 615-624 again. Once operations 615-624 has been performed for all positions of token t in the digital document, method 600 repeats operations 613-624 for the next potential prior or post block identified during operation 611. In the end, method 600 results in a confidence score at each potential prior or post block that is identified for each location in the digital document where a token from the token index is found (i.e., potential position of a field). From the confidence score, some embodiments can determine if a candidate prior and a candidate post block exist at each location a token is found in the digital document and, if so, which prior and post block best identifies match that location.

FIGS. 7-15 illustrate an example of an embodiment of the present invention being used to train an extraction field template. During the illustrated training process, the embodiment will learn how to recognize the designated field in other digital documents and capture that learning (i.e., training data) in an extraction field template, which can be later used to extract information from similar fields in other digital document.

FIG. 7 provides an image clipping from a page of a marked-up digital document, where a human analyst has designated a field by drawing a rectangle 703 around the field contents sought to be extracted during training (also referred to herein as the "baseline"). From the baseline, an example prior block and an example post block can be obtained for the given baseline.

Here, the baseline is "Lane Investment Properties" and the field type being trained upon for FIGS. 7-15 is the borrower field. Though embodiments of the invention may receive digital documents in one of a variety computer file formats, here the image provided is from an image file (e.g., BMP, JPEG, TIFF) of a page of the marked-up digital document. Accordingly, before the digital document can be used for training, it has to be processed by OCR software to make the text in the digital document computer readable, and the rectangle around the field would need to be captured to provide the embodiment with relevant markup information.

Once the image clipping of FIG. 7 has been processed by OCR software and the markup information has been captured, the embodiment finds the position of the first and last tokens of the baseline, in this case, "Lane" and "Properties." Moving backward from the first token of the baseline, the embodiment selects five tokens for the prior block. As described herein, the number of tokens selected to create an example prior or an example post block may be predetermined, and set based on past efficiency and accuracy of the embodiment.

For FIG. 7, the prior block is determined to be "under said promissory note. Borrower:." Next, moving forward from the last token of the baseline, the embodiment selects another five tokens for the post block. Here, the post block is determined to be "Name & Title of Princi.". The prior block and the post block are subsequently added to data structure 800 illustrated in FIG. 8, which maintains a list of all potential prior and post blocks for the current field type being trained upon (i.e., borrower field). These added prior and post blocks represent example prior and post blocks for the current field type.

Turning now to FIG. 8, data structure 800 maintains the following block information for each block listed: m_discrimination, which indicates the weight (i.e., discriminating power) of the block in identifying a certain field type (in the illustrated case, the borrower field type); m_used, which is the aggregated sum of how many times all the tokens contained in the block have actually been found to be in the block during training; m_occurrence, which is the aggregated sum of how many times tokens contained in the block have generally appeared in marked-up digital documents during training; m_occurrentType, which indicates whether the block is a prior block or a post block; and m_words, which is an object that maintains the list of the tokens contained in the block, and information related to each token: (i) the token's frequency information (i.e., how often the token has generally appeared in marked-up digital documents during training), (ii) token's occurrence information (i.e., how often the token has been found to be in the block during training), and (iii) each token's weight information based on the token's frequency information and the token's occurrence information. Usually, a data structure such as data structure 800 would be populated with values from previous training sessions. When such is the case, the values in data structure 800 are merely updated with values obtained from the current training session (e.g., the old value and new value may be added). Here, however, is assumed that this is the first time these prior and post blocks have been encountered during a training session and, as such, the values are blank (i.e., 0) for now.

Next, the embodiment populates the m_words object for each of the prior block and the post block. The tokens added to the m_words object of the prior block are illustrated in data structure 900 of FIG. 9, and the tokens added to the m_words object of the post block are illustrated in data structure 1000 of FIG. 10. As illustrated here and in accordance with some embodiments described herein, each m_words object maintains: the token's frequency information (m_occurrence_token)–number of times the token has generally been encountered in marked-up digital documents; and the token's occurrence information (m_used_token)–number of times the token has been encountered in the prior/post block associated with the m_words. Based on these numbers, the m_words object also maintains the weight of each token (m_discrimination_token) with respect to the block; the weight of the token represents the tokens ability to identify the associated prior/post block given its presence in a digital document. Here, m_discrimination_token appears with zeroes in structures 900 and 1000 because, again, we are assuming this is the first time these tokens have been encountered during a training session and, as such, the weights have yet to be calculated. As before, if data structures 900 and 1000 were already populated with values from previous training sessions, the values contained therein would merely be updated with values from the current training session (e.g., the old value and new value may be added).

FIG. 11 illustrates what happens when the prior block "under said promissory note. Borrower:" has been encountered in a past training session and the values in data structure 900 have been updated by adding old values to new values.

Subsequent to the tokens being added to the token index, the embodiment calculates the weight of each token in the token index according to the formula m_discrimination_token=m_used_token/m_occurrence_token. FIGS. 12 and 13 illustrate the calculated token weights populated for data structures 900 and 1000 respectively.

Once the token weight values in data structures 900 and 1000 have been updated, the embodiment can update the m_discrimination values, m_used values, and m_occurrence values of example prior and post blocks to which the token are associated in data structure 800. These updates, are based on the relationship of each m_words object to a specific example prior or post block. Here, for each block in data structure 800, the values of m_discrimination, m_used, and m_occurrence are each calculated by summing m_discrimination_token, m_used_token, and m_occurrence_token values found in the block's corresponding m_words object. For instance, the prior block weight (m_discrimination value) for "under said promissory note. Borrower:" is equal to 4.5 because the sum of all token weights (m_discrimination_token value) contained in that prior block's m_words object is 1+1+0.5+1+1 (See, FIG. 12). These and other updated values for data structure 800 are illustrated in FIG. 14.

In the end, the embodiment adds the tokens from the both the prior block and the post block to a common token index which associates each token with each prior or post block in which it appears. The token index as data structure 1500 in FIG. 15, where the Tokens column lists the tokens and the Occurrences column lists the prior and post blocks encountered during training that contain the token. As described herein, such an index token could be used to locate potential positions within a digital document where fields may exist, and to determine potential prior and post blocks that may be located at those potential positions.

At the conclusion of the training process, the example prior blocks, the example post blocks, and other block related information (e.g., token weight, token frequency, block weight, block frequency, indices of tokens etc.) produced during the training process are stored into an extraction field template, which can be subsequently used to identify prior and post blocks in digital documents, and use those identified prior and post blocks to locate fields in the digital document from which extract information can be extracted.

It should be noted that in some embodiments, the token weight information or block weight information used by embodiments of the invention and discussed herein can be adjusted subsequent to the training process using systems and methods configured to optimize such values before future use. For example, embodiments of the present invention may use systems and methods such as those disclosed in U.S. Pat. No. 7,593,834, entitled "Exclusion of regions method for multi-objective optimization," to optimize the token weight values or block weight values stored in an extraction field template before the extraction field template is utilized to identify prior and post blocks in a digital document. In another example, systems and methods based on the algorithm described in the paper "Hybrid Multi-Gradient Explorer Algorithm for Global Multi-Objective Optimization", by Vladimir Sevastyanov (2010 AIAA ATIO/ISSMO Conference) may be utilized to optimize the token weight values or block weight values stored in an extraction field template. Both U.S. Pat. No. 7,593,834 and the paper "Hybrid Multi-Gradient Explorer Algorithm for Global Multi-Objective Optimization", by Vladimir Sevastyanov (2010 AIAA ATIO/ISSMO Conference) are hereby incorporated herein by reference in their respective entirety. In some embodiments, the training processes described herein allow the embodiments to determine an approximate and initial weight values or block values, and an optimization process is subsequently utilized to improve accuracy of the filter. In some instances, embodiments utilizing optimization can decrease the number of incorrectly processed documents by 10-30%.

Depending on the embodiment, the optimization task formulation may be formulated as follows:

Maximize Score=$F_1(W)$

Maximize Confidence=$F_2(W)$ $$\text{where } W=\{w_1, w_2, w_3, \ldots, w_N\}, w_i \in [0,1], i=1, \ldots N \qquad (1)$$

where Score in (1) is a measure of the extraction accuracy based on the comparison of what has been extracted using an embodiment with a priori known marked up results; Confidence in (1) is a measure of accuracy based on frequency of tokens found in the training process; W is a set of weights for all the tokens collected over a training session; and N is the number of tokens collected in a training process. In some embodiments, Confidence is estimated without use of markup information and, rather, be based on words' frequencies, while Score estimation is based on comparison of markup information with extracted results (i.e., Score=1 only if extracted results are identical to markup info). Both Score and Confidence depend on the tokens' weights. During optimization, Score and Confidence are maximized using a optimization methods/algorithms that finds a set of token weights W which maximizes Score and Confidence, where the maximized Score and Confidence deliver the best possible extraction results, for an embodiment.

FIGS. 16-20 illustrate an example of an embodiment of the present invention being used to extract field information from a digital document. During the extraction process, the embodiment identify candidate prior and post blocks within the digital document using information from an extraction field template and, based on those candidate prior and post blocks identify fields and extract information therefrom.

FIG. 16 provides an image clipping from a page of the digital document from which field information will be extracted. As noted before, though embodiments of the invention may receive digital documents in one of a variety computer file formats, here the image provided is from an image file (e.g., BMP, JPEG, TIFF) of a page of the digital document from which field information will be extracted. Accordingly, before the digital document can be used for training, it has to be processed by OCR software to make the text in the digital document computer readable, and the rectangle around the field would need to be captured to provide the embodiment with relevant markup information.

When explaining the following embodiment, data structure 1700 of FIG. 17 is assumed to illustrate the contents of the extraction field template being used to extract field information from the digital document. Additionally, data structure 1500 of FIG. 15 is assumed to be used to locate potential positions of prior and post blocks in the digital document and to determine the potential prior and post blocks that may be located at those potential positions. Though the embodiment is described below with respect to identifying potential post blocks, after reading this description one of ordinary skill would readily understand and appreciate that the embodiment (and others like it) can be readily utilized to identify potential prior blocks in a similar manner.

The embodiment starts by locating tokens from data structure 1500 in the digital document. In FIG. 18, the embodiment has done such as that by locating the "&" token in the digital document. Using data structure 1500, the embodiment determines that two potential blocks contain the "&" token: "Name & Title of Princi" and "Name & Title of:," both of which are identified as post blocks. The embodiment initializes the match score for each potential block to the multiplication product of: (a) the coefficient of coincidence ($K_i$) from comparing the located token to the potential blocks, and (b) the weight of the located token with respect to each potential block (i.e., m_discrimination_token from the potential block's m_word object). In other words, The embodiment initializes the match score for each potential block with $K_i \times$ m_discrimination_token.

The coefficient of coincidence represents how well two tokens match or how well two strings of tokens match. For example, where there is an exact match, the coefficient would be calculated to be 1. However, two tokens do not exactly match, the coefficient would be a number less than 1. For example, where the "Princi" token is compared to the "Principal" token, the coefficient of coincidence may be calculated to be 0.67. Depending on the embodiment, various methodologies can be utilized to facilitate the comparison and calculation of the coefficient of coincidence. For instance, embodiments of the invention could utilize a comparison function based on the Needleman-Wunsch algorithm to compare two tokens and determine their coefficient of coincidence.

Here, the embodiment initializes the match score for both potential blocks to 1 because coefficient of coincidence for each potential block is 1 (the token "&" is an exact match in both potential blocks) and the weight of the "&" token for each potential block is also 1 (see, data structure 1700).

Continuing with the embodiment, taking each potential block, the tokens of the potential block are compared with the tokens located around the "&" token in the digital document. For example, for the block "Name & Title of Princi," moving from the position of the selected token (i.e., "&" token) to the top of the block, each token of the potential block is compared to a token in the digital document, where the tokens are corresponding positions relative to the selected token. As described herein, the token comparison can be facilitated by a comparison function based on the Needleman-Wunsch algorithm. For each token comparison, a coefficient of coincidence is calculated, multiplied by the weight of the token with respect to the potential block "Name & Title of Princi," and that product added to the match score being maintained for the potential block "Name & Title of Princi." For example, because the "Name" token from the potential block matches the "Name" token from the digital document, the coefficient of coincidence ($K_i$) is 1 and the weight of the "Name" token is 1 (see, data structure 1700) and their product (i.e., 1) is added to the match score for the potential block "Name & Title of Princi" (i.e., making it 2).

Once the token reaches the beginning of the potential block, the embodiment moves from the position of the selected token (i.e., "&" token) to the bottom of the block, comparing each token of the potential block to a token in the digital document, where the tokens are corresponding positions relative to the selected token.

At the conclusion of the comparing the potential block "Name & Title of Princi" to the digital document, the embodiment starts the comparison process on the other potential block, "Name & Title of:," and a match score is calculated.

Before the confidence score is calculated for each potential block, the influence of the starting tokens (in the case of potential post blocks) and the influence of ending tokens (in the case of potential prior blocks) need to be taken into account for each potential block. Specifically, how well the beginning string of tokens in a potential post block or the end string of tokens in a potential prior block matches the tokens of the digital document can influence the match score of that particular potential prior or post block. For example, where the potential block is a potential post block, the coefficient of coincidence ($K_i$) of first 3 tokens of each potential block may be added to its match score to account for the influence of starting tokens of the block. Here, because we are dealing with potential post blocks, because the, first 3 tokens of the "Name & Title of:" block exactly match the digital document, the coefficient of coincidence ($K_i$) of 1 is be added to the match score. Hence, if the match score of the "Name & Title of Princi" block was equal to 3.72, the match score would now be 4.72.

Additionally, the weight of the potential block (i.e., m_discrimination of the potential block) may also be influenced by its starting or ending tokens matching the digital document. For example, the embodiment may add 1 to the weight of the "Name & Title of Princi" block to account for its starting 3 tokens matching the digital document (making its weight now 5.05).

Once the match score and the weight of each potential block has been influenced by their starting or ending tokens, the confidence score of the potential block is calculated. Here, the embodiment may calculate the confidence score of the potential block by dividing its influenced match score by its influenced weight. For example, where the influenced match score of the "Name & Title of Princi" block is 4.72 and the influenced weight of the "Name & Title of Princi" block is 5.05, the confidence score would be 0.93.

After the embodiment has repeated the foregoing steps for all tokens from data structure 1500 found in the digital document, the embodiment results in a list of a list of candidate prior blocks with confidence scores, and a list of candidate post blocks with confidence scores. FIGS. 19 and 20 illustrate such candidate lists based on the embodiment being run on FIG. 16. From these candidates lists, the embodiment can selected from the best prior block based on confidence scores, and the best post block based on confidences scores. It should be noted that when selecting a best post block, the post block candidate having the highest confidence score would not be selected if it comes before the prior block in the digital document. Where such is the case, the candidate post block selected may be the post block have the next highest confidence score. In some embodiments, if the two or more post candidates following the best prior block have the same highest confidence score, the candidate post block selected may be the post block located closer to the selected best prior block. The selected prior block and the selected post block delineate the field from which information can be extracted (the information being the tokens contained between end of the selected prior and the start of the selected post block).

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 21:
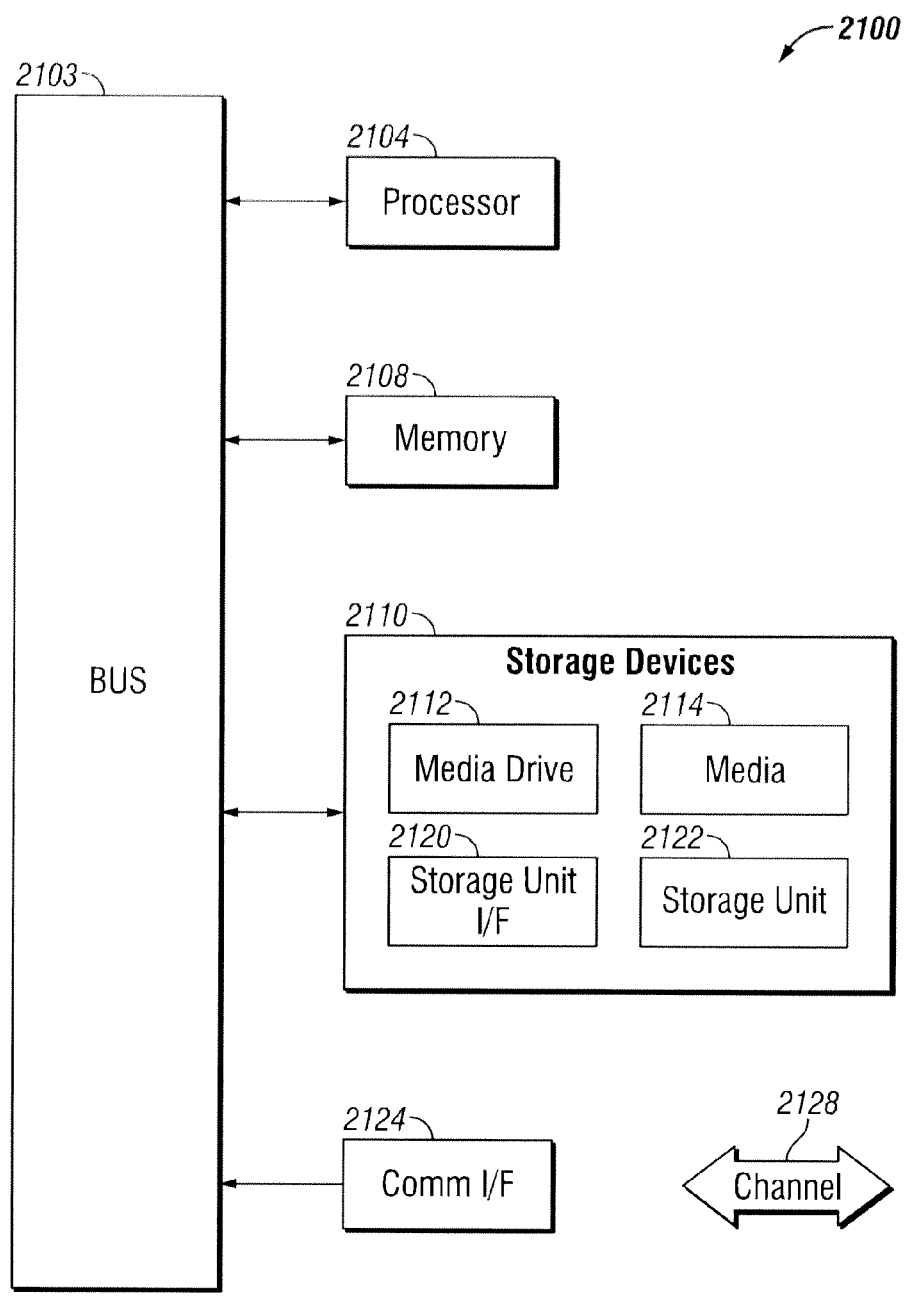
FIG. 21 illustrates an example of a computing module that can be used in conjunction with systems and methods described herein.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 21. Various embodiments are described in terms of this example-computing module 2100. After reading this description, it will become apparent to a person skilled in the relevant art how to implement the invention using other computing modules or architectures.

Referring now to FIG. 21, computing module 2100 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 2100 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 2100 might include, for example, one or more processors, controllers, control modules, or other processing devices, such as a processor 2104. Processor 2104 might be implemented using a general-purpose or special-purpose processing engine such as, for example, a microprocessor, controller, or other control logic. In the illustrated example, processor 2104 is connected to a bus 2102, although any communication medium can be used to facilitate interaction with other components of computing module 2100 or to communicate externally.

Computing module 2100 might also include one or more memory modules, simply referred to herein as main memory 2108. For example, preferably random access memory (RAM) or other dynamic memory, might be used for storing information and instructions to be executed by processor 2104. Main memory 2108 might also be used for storing temporary variables or other intermediate information during execution of instructions to be executed by processor 2104. Computing module 2100 might likewise include a read only memory ("ROM") or other static storage device coupled to bus 2102 for storing static information and instructions for processor 2104.

The computing module 2100 might also include one or more various forms of information storage mechanism 2110, which might include, for example, a media drive 2112 and a storage unit interface 2120. The media drive 2112 might include a drive or other mechanism to support fixed or removable storage media 2114. For example, a hard disk drive, a floppy disk drive, a magnetic tape drive, an optical disk drive, a CD or DVD drive (R or RW), or other removable or fixed media drive might be provided. Accordingly, storage media 2114 might include, for example, a hard disk, a floppy disk, magnetic tape, cartridge, optical disk, a CD or DVD, or other fixed or removable medium that is read by, written to or accessed by media drive 2112. As these examples illustrate, the storage media 2114 can include a computer usable storage medium having stored therein computer software or data.

In alternative embodiments, information storage mechanism 2110 might include other similar instrumentalities for allowing computer programs or other instructions or data to be loaded into computing module 2100. Such instrumentalities might include, for example, a fixed or removable storage unit 2121 and an interface 2120. Examples of such storage units 2121 and interfaces 2120 can include a program cartridge and cartridge interface, a removable memory (for example, a flash memory or other removable memory module) and memory slot, a PCMCIA slot and card, and other fixed or removable storage units 2121 and interfaces 2120 that allow software and data to be transferred from the storage unit 2121 to computing module 2100.

Computing module 2100 might also include a communications interface 2124. Communications interface 2124 might be used to allow software and data to be transferred between computing module 2100 and external devices. Examples of communications interface 2124 might include a modem or softmodem, a network interface (such as an Ethernet, network interface card, WiMedia, IEEE 802.XX or other interface), a communications port (such as for example, a USB3 port, IR port, RS232 port Bluetooth® interface, or other port), or other communications interface. Software and data transferred via communications interface 2124 might typically be carried on signals, which can be electronic, electromagnetic (which includes optical) or other signals capable of being exchanged by a given communications interface 2124. These signals might be provided to communications interface 2124 via a channel 2128. This channel 2128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2108, storage unit 2120, media 2114, and channel 2128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 2100 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer program product for extracting field data from a digital real estate document, the product comprising a non-transitory computer-readable medium including program instructions embedded therein, the program instructions configured to cause a computer system to perform the operations of:

using an extraction field template for a document classification to identify in the digital real estate document a set of candidate prior blocks for a specific field type and a set of candidate post blocks for the specific field type;

selecting a best prior block from the set of candidate prior blocks and a best post block from the set of candidate post blocks; and extracting a token block located between the best prior block and the best post block, wherein the token block is the field data and is associated with the specific field type.

2. The computer program product of claim 1, wherein using the extraction field template to identify the set of candidate prior blocks and the set of candidate post blocks comprises:

searching the digital real estate document for a select token, wherein the select token is selected from a set of tokens associated with the specific field type and the set of tokens is from the extraction field template;

identifying an example prior block or an example post block in the extraction field template that contains the select token; and adding the example prior block to the set of candidate prior blocks or adding the example post block to the set of candidate post blocks.

3. The computer program product of claim 2, wherein the example prior block is used to identify in the digital real estate document a candidate prior block, and wherein the example post block is used to identify in the digital real estate document a candidate post block.

4. The computer program product of claim 3, wherein the example prior block and example post block each comprise block information, and wherein the block information includes token frequency information, token occurrence information, token weight information, block occurrence information, or block weight information.

5. The computer program product of claim 1, wherein the program instructions are further configured to cause the computer system to train the extraction field template using a marked-up sample document by performing the operations of:

using markup information in the marked-up sample document to locate an example prior block for the specific field type or an example post block for the specific field type;

converting the example prior block to example prior block information or the example post block to example post block information, wherein example prior block information or example post block information includes token frequency information, token occurrence information, token weight information, and block weight information; and updating the token weight information for the example prior block or the example post block based on token frequency information and token occurrence information.

6. The computer program product of claim 4, wherein updating the token weight information comprises updating a token weight for each token within the example prior block or the example post block.

7. The computer program product of claim 5, wherein training the extraction field template further comprises:

updating the block weight information based on the token weight information.

8. The computer program product of claim 6, wherein training the extraction field template further comprises:

saving the example prior block or the example post block to the extraction field template; and associating the example prior block or the example post block with the specific field type.

9. The computer program product of claim 1, wherein the program instructions are further configured to cause the computer system to perform the operation of identifying the document classification for the digital real estate document.

10. A computer-implemented method for extracting field data from a digital real estate document, comprising:

using an extraction field template for a document classification to identify in the digital real estate document a set of candidate prior blocks for a specific field type and a set of candidate post blocks for the specific field type;

selecting a best prior block from the set of candidate prior blocks and a best post block from the set of candidate post blocks; and extracting a token block located between the best prior block and the best post block, wherein the token block is the field data and is associated with the specific field type.

11. The method of claim 10, wherein using the extraction field template to identify the set of candidate prior blocks and the set of candidate post blocks comprises:

searching the digital real estate document for a select token, wherein the select token is selected from a set of tokens associated with the specific field type and the set of tokens is from the extraction field template;

identifying an example prior block or an example post block in the extraction field template that contains the select token; and adding the example prior block to the set of candidate prior blocks or adding the example post block to the set of candidate post blocks.

12. The method of claim 11, wherein the example prior block is used to identify in the digital real estate document a candidate prior block, and wherein the example post block is used to identify in the digital real estate document a candidate post block.

13. The method of claim 12, wherein the example prior block and example post block each comprise block information, and wherein the block information includes token frequency information, token occurrence information, token weight information, block occurrence information, or block weight information.

14. The method of claim 13, further comprising training the extraction field template using a marked-up sample document by performing the operations of:

using markup information in the marked-up sample document to locate an example prior block for the specific field type or an example post block for the specific field type;

converting the example prior block to example prior block information or the example post block to example post block information, wherein example prior block information or example post block information includes token frequency information, token occurrence information, token weight information, and block weight information; and updating the token weight information for the example prior block or the example post block based on token frequency information and token occurrence information.

15. The method of claim 14, wherein updating the token weight information comprises updating a token weight for each token within the example prior block or the example post block.

16. The method of claim 15, wherein training the extraction field template further comprises:

updating the block weight information based on the token weight information.

17. The method of claim 16, wherein training the extraction field template further comprises:

saving the example prior block or the example post block to the extraction field template; and associating the example prior block or the example post block with the specific field type.

18. The method of claim 10, further comprising identifying the document classification for the digital real estate document.

19. The computer program product of claim 2, wherein using the extraction field template to identify the set of candidate prior blocks and the set of candidate post blocks comprises:

searching the digital real estate document for a plurality of select tokens, wherein each of the plurality of select tokens is selected from a set of tokens associated with the specific field type and the set of tokens is from the extraction field template;

for each of the plurality of select tokens, identifying an example prior block or an example post block in the extraction field template that contains the token;

adding the identified example prior blocks to the set of candidate prior blocks; and adding the identified example post blocks to the set of candidate post blocks.

20. The method of claim 10, wherein the best prior block is selected based at least in part on the influence of one or more ending tokens in the best prior block and wherein the best post block is selected based at least in part on the influence of one or more starting tokens in the best post block.

\* \* \* \* \*